HIGH-FREQUENCY ULTRASONIC GENERATORS

Filed Sept. 10, 1964

INVENTOR
THOMAS J. SCARPA
BY Martha G. Pugh
ATTORNEY

United States Patent Office 3,321,189
Patented May 23, 1967

3,321,189
HIGH-FREQUENCY ULTRASONIC GENERATORS

Thomas J. Scarpa, Metuchen, N.J., assignor, by mesne assignments, to Edison Instruments, Inc.
Filed Sept. 10, 1964, Ser. No. 395,475
8 Claims. (Cl. 259—144)

This relates in general to the generation of high-frequency mechanical vibrations; and more particularly, to the mounting of high-frequency piezoelectric transducers.

Piezoelectric crystal wafers, whether homogeneous or of ceramic material, which are designed to vibrate in a principal thickness mode at frequencies of a megacycle or more, are generally thin and frangible. In the prior art, it has been customary to mount such wafers on backing or loading elements, which, in turn, are mounted in supporting frames for handling purposes. At high frequencies, it has been found that these supporting frames or mounting devices operate to substantially damp or clamp the vibratory motion, so that the maximum power which can be generated with a piezoelectric generator of this type at frequencies of the order of a megacycle or more is of the order of 50 watts.

For many types of applications which make use of high-frequency compressional waves for stirring, mixing, or atomizing functions, a more powerful piezoelectric generator operative in the megacycle range would be very desirable.

Accordingly, a principal object of the present invention is to provide a high-frequency ultrasonic generator of increased efficiency and power. A more particular object of the invention is to provide a holder for high-frequency piezoelectric driving elements which imposes minimum damping action on the vibratory motion. Another object of the invention is to provide a high-powered piezoelectric vibrator for frequencies in the megacycle range which is adapted to be grasped and applied manually for a variety of ultrasonic mixing, stirring, and atomizing operations.

These and other objects are attained in the combination of the present invention, which comprises a unique mounting device for piezoelectric crystal elements, designed to reduce to a minimum the clamping action of the holder assemblage on the generated vibrations, and to generally increase the facility with which such a generator is used. In accordance with the present invention, a piezoelectric crystalline wafer, a half-wavelength thick in the vibrating frequency, and poled to vibrate in a thickness mode, is mounted concentrically on the underside of a backing or supporting disk, also a half-wavelength thick. On the upper and lower surfaces of the disk, slightly removed from the periphery of the piezoelectric wafer, is a pair of matching annular indentations, the flat inner surfaces of which form between them an annular ring a few thousandths of an inch thick, which makes annular contact with the central, wafer mounting portion, of the disk at its quarter-wave or nodal plane in a thickness direction, where the vibratory motion is at a minimum. The backing element, with the crystalline wafer rigidly mounted on its underside, forms a vibratory unit substantially one wavelength thick. The disk 2 is mounted at its edges, beyond the annular indentations, on a cylindrical cup, so that the vibratory crystal element projects into the cavity. An elbow connector which is screwed to an opening in the curved wall of the cylindrical cup, serves for connection to an elongated tube which acts both as a rigid handle and as a conduit for electrical connections to the piezoelectric wafer.

Inasmuch as the piezoelectric wafer and the supporting portion of the half-wave backing disk are suspended only at a nodal plane in the vibratory system, they are substantially mechanically isolated from the supporting frame, the vibratory motion generated by the unit being virtually undamped. It has been found, using a transducer assemblage in accordance with the present invention, that it is possible to generate vibrations in the megacycle range up to a maximum power of about 250 watts.

A particular feature of the device of the present invention is the facility with which it can be grasped, transported, and applied manually. For example, the shallow cylindrical airtight cup in which the piezoelectric driving element is suspended may be of the order of two inches in outer diameter, and about three-quarters of an inch thick, with a connecting conduit or handle, say, six inches long. Such a device readily fits into an ordinary drinking glass or cocktail shaker where it is especially adapted to apply high-powered ultrasonic waves in a very high-frequency range to the mixing and stirring of beverages and the like; or, it readily fits into a beaker or other container for generating a beam for ultrasonic cleaning purposes or for emulsifying, mixing, dissolving, or atomizing components for medical or chemical uses.

Many other objects, features, and advantages will occur to those skilled in the art after a study of the specifications hereinafter, together with the attached drawings, in which.

Figure 1:
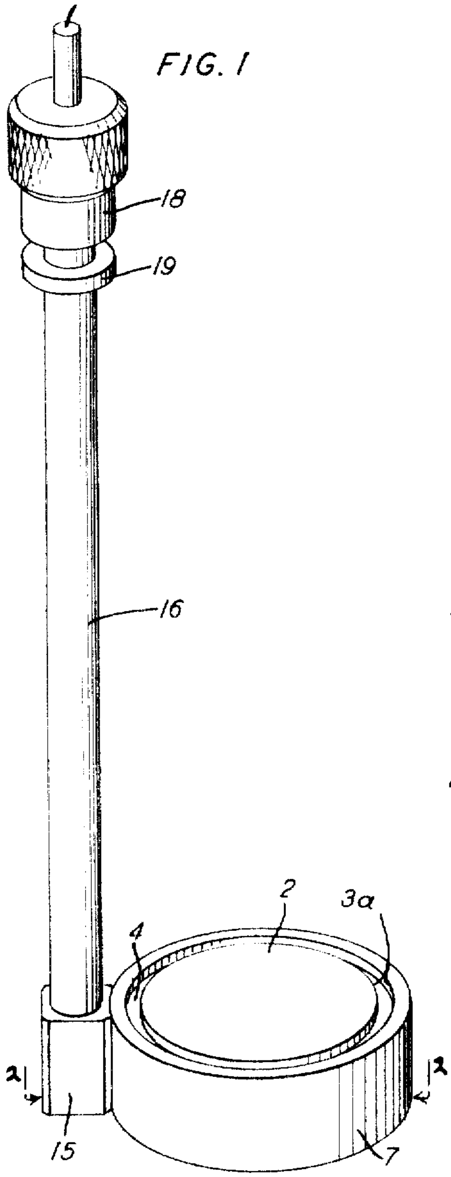
FIG. 1 is a showing, in perspective, of one embodiment of the piezoelectric driving unit of the present invention.

Referring in detail to the drawings, FIG. 1 is substantially a life-size showing, in perspective, of the device of the present invention, as actually constructed.

Figure 2:
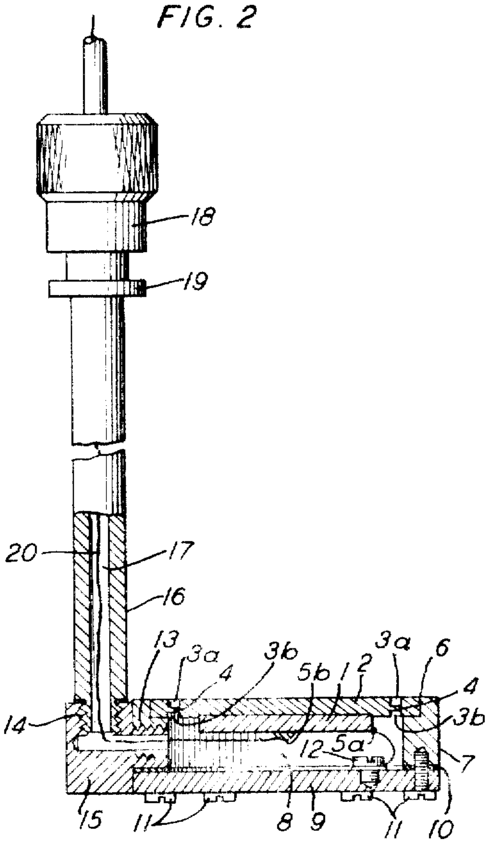
FIG. 2 is a cross sectional view of the assemblage of FIG. 1, taken along the line 2—2.

In the cross sectional showing of FIG. 2, the piezoelectric crystal element 1 in the present illustrative embodiment may comprise any of the piezoelectric crystal elements well-known in the art which are cut or formed and poled to vibrate in a thickness direction such as, for example, a ceramic wafer of lead zirconate titanate or alternatively, a wafer of modified barium titanate with a cobalt additive, known by the trade name "Channelite" which is manufactured by Channel Industries of California. Prior to mounting, the piezoelectric wafer 1 is treated in a manner well-known in the art by applying an electrical potential across the electrode contacts, through the thickness thereof, while heating it up to above the Curie temperature and letting it cool again to room temperature, in order to pole the wafer for vibration in a principal thickness mode. It is then aged in a manner well-known in the art. The wafer 1 is designed to be substantially a half-wavelength thick in the principal vibrating frequency. In the present illustrative embodiment, the wafer 1 has a diameter of one and one-half inches and a thickness of one-eighth of an inch for a resonant frequency of substantially one megacycle, although it will be understood that this is varied in accordance with the desired resonant frequency.

Figure 5:
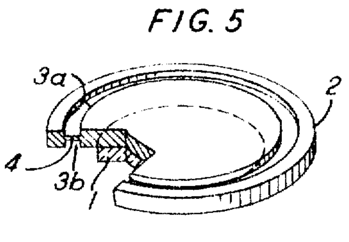
FIG. 5 is a perspective showing of the upper plate of FIG. 1, cut away to show a portion of the crystal wafer mounted on its underside.

Crystal element 1 is concentrically mounted on the underside of a backing disk 2 which may comprise any material having a good coefficient of conductivity for sonic waves such as, for example, aluminum, stainless steel, brass, the alloy known by the trade name "Monel," or alternatively any nonmetallic sold having similar acoustic properties, such as those known by the trade names "Bakelite" and "Nylon." In the present illustrative embodiment, the disk 2 which is also a half-wavelength thick in the principal vibrating frequency of the piezoelectric wafer 1, is aluminum having a two inch diameter and a thicknss of three-sixteenths of an inch. To accommodate the crystalline wafer 1, disk 2 has a slight concentric recess of several thousandths of an inch on its underside. Crystal wafer 1 is fitted into this recess and bonded thereto by means of a conventional epoxy bonding material or other similar bonding material which is cured in a manner well-known in the art. Prior to bonding, the mating surface of crystal element 1 is cleaned ultrasonically by exposing it to ultrasonic action in a container of isopropyl alcohol or acetone, or any similar solvent characterized by rapid evaporation, at say, 40 kilocycles, for about ten minutes. Similarly, backing element 2, after machining, is exposed to ultrasonic cleaning in a bath of tepid water, at a frequency within a similar frequency range. After ultrasonic cleaning the crystal mating surface of disk 2 may be etched, for improved performance, in a ten to twenty percent solution of hydrochloric acid, or a similar etchant, until it is sufficiently free of grease and oil on the surface, so that water under an open tap will wet the surface completely. The vibratory structure will be better understood by reference to the perspective showing in FIG. 5, the cut-away portion of which indicates the manner in which the ceramic wafer 1 is fitted into the underside of the disk 2. Thus, it will be apparent that the combination of the wafer 1 with the backing element 2 forms a vibrating system substantially one wavelength thick, in the direction of propagation of the vibrations, which is the thickness direction of the wafer and backing disk.

For the purposes of the present invention, the bonding agent which is applied may or may not be conductive. In the former case the conductive epoxy forms the upper electrode coating of the crystal wafer 1. Alternatively, there is a thin conducting layer evaporated on, or otherwise applied to the upper face. For convenience, a contact *5a* which is connected to the upper face may be brought around to the underside, where it is electrically insulated from the electrode contact *5b* which is connected to an electrode coating of silver paste or the like, a few thousandths of an inch thick which is evaporated or otherwise applied to the under surface of crystalline wafer 1.

A principal feature of the present invention is the fact that between the edge of the mounting disk 2 and the periphery of the attached piezoelectric element 1 are machined or otherwise formed a pair of annular grooves *3a* and *3b* of rectangular cross section on the upper and lower faces, each substantially .0575 inch deep and three-thirty-seconds of an inch wide. Grooves *3a* and *3b* are matched on the upper and lower surfaces so that they form between them a thin annular supporting ring 4 which is approximately .01 inch thick and three-thirty-seconds of an inch across. This is shown in perspective in the cut-away portion of FIG. 5. The annular ring 4 serves to contact the central portion of the disk 2 precisely at a nodal plane in the vibratory motion where the longitudinal displacement is practically at a minium. Extending outwardly from the matching grooves *3a* and *3b* is a flanged projection or continuation of the disk 2 which is approximately one-eighth of an inch wide in the radial direction and which serves for mounting the vibrating system in a holder.

The supporting disk 2 is mounted in the manner of a closure on a shallow cylindrical cup which is formed from an aluminum tube 7 which has an outer diameter of two and one-quarter inches, an inner diameter of one and three-quarter inches, and a depth of five-eighths of an inch. The upper portion of the tube 7 includes an inner shoulder or flanged portion 6 formed by stepping back the inner radius approximately one-eighth of an inch, to a depth of three-sixteenths of an inch from the top. This flange or shoulder 6 serves as a peripheral support for the disk 2, where the latter may be sealed in place with any of the well-known bonding agents having good acoustic conducting properties, such as an epoxy known by the trade name "Epon VIII" manufactured by the Shell Chemical Company.

The base plate 9 is formed, for example, of aluminum, has an over-all diameter of two and one-quarter inches and is one-fourth of an inch thick. In the particular embodiment under description, base plate 9 is bolted or screwed onto the end of the tube 7 by means of the screws 11. In order to form a liquid-tight seal, a gasket 10 may be interposed between the contacting surfaces of the tube 7 and the base plate 9. The gasket 10 is cemented or bonded in a liquid-tight seal with the contacting surfaces by any of the cements well-known for such purposes.

Figure 3:
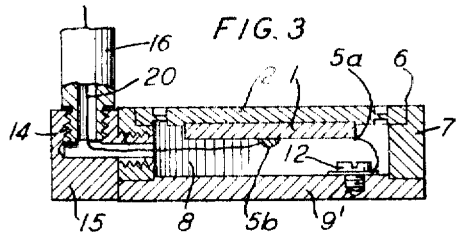
FIGS. 3 and 4 are slight modifications of the combination shown in FIGS. 1 and 2.
Figure 4:
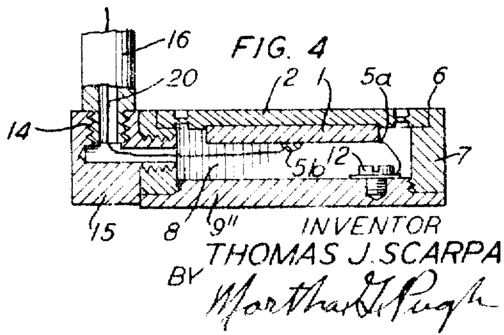

FIGS. 3 and 4 illustrate combinations in which alternative methods are used for assembling the base plate 9 and the tube portion 7.

In the embodiment of FIG. 3, for example, the base plate 9', which has an outer diameter of two and one-half inches as in the previous embodiment, is three-sixteenths of an inch thick, except for a slightly raised circular portion one and three-quarter inches in diameter, and from .01 to .015 inch thick, on its upper face. This provides a slight shoulder against which is mounted the lower annular surface of the tube 7. The latter is bonded with an adhesive of good acoustic conducting properties, such as an epoxy resin, which may, for example, be the bonding agent known by the trade name "Epon VIII" described above. A liquid-tight seal is thus formed. It will be noted that no screws are used externally in this embodiment.

In the embodiment of FIG. 4, the base plate 9'' is formed so that the raised central portion is raised substantially higher with respect to the annular end portion than that of FIG. 3, and is screw-threaded, fitting into matching screw threads on the lower inside surface of the tube 7. Aside from the modifications described, these embodiments are substantially similar to the embodiment of FIG. 2.

The cup formed from tube 7 in the manner previously described, has an inner air-filled chamber 8 which in the embodiment of FIG. 2 has an inner diameter of one and three-quarter inches and a depth of seven-sixteenths of an inch within which chamber the inner face of the crystal wafer 1 is disposed to vibrate freely. A screw opening 13 in one of the curved walls of the tube 7 accommodates a hollow screw connector feeding into an elbow connector 15 of steel or the like which has an outer diameter of three-fourths of an inch and is approximately one inch from top to bottom. In addition to being screwed into place, elbow connector 15 may also be sealed with a liquid-tight seal of epoxy resin of the type previously described or some other of the sealing compounds well-known in the art. The upper end of the elbow 15 has a hollow screw fitting 14 approximately five sixteenths of an inch in diameter, the lower end of which connects with the inner passage from chamber 8. A steel tube 16, which has an outer diameter of three-eighths of an inch, an inner diameter of three-sixteenths of an inch, and in the present illustrative embodiment is six inches long, is screwed into the hollow fitting 14 of elbow 15. The tube 16 terminates in a shielded coaxial cable connector 18, such as one of the types manufactured by the American Phenolic Corporation, and known by the trade name "Amphenol" connectors. This is sealed to the outer surface of the rod 16 by means of an epoxy or other bonding agent of one of the types heretofore described.

As to the electrical connections for driving the device of the present invention to vibrate, the contact 5_a_ to the upper electrode coating of wafer 1 is grounded by connection to a screw 12 on the inner surface of base plate 9. Contact to electrode 5_b_ on the lower surface of the crystal element 1 is made by means of a lead wire 20 which passes through the hollow fitting 14 in the elbow connector 15, sealed in a liquid-tight seal with a bonding compound such as epoxy resin or the like. It then passes through the conduit 17 comprising the metal tube 16 and the coaxial connector 18, having a flange 19, to an outer terminal which may be connected to a source (not shown) of alternating current high-frequency oscillations, of any of the types well-known in the art.

To make the device liquid-tight, and to improve its appearance and wearing qualities, the top may be painted with an epoxy paint. The lower portions may be similarly painted with epoxy paint to seal up the openings.

It will be seen from the foregoing description that the device of the present invention includes a piezoelectric element in which the damping action of the supporting frame is substantially minimized. This permits the system, including the driving element and the supporting frame, to vibrate at frequencies exceeding a megacycle, generating vibrations at an output power of up to, for example, 250 watts, a level of power heretofore unobtainable with devices of this type.

Moreover, because of the unique design and the facility with which the device of the present invention is grasped and moved from place to place for the application of ultrasonic waves, it will be obvious to those skilled in the art that such a device has utility for many different types of applications. For example, such a unit forms a highly mobile device for various types of ultrasonic cleaning operations where it is simply thrust into a beaker or vat of the liquid in which it is desired to generate vibrations. Moreover, it also has high utility in the field of materials testing, by means of cavitation, inasmuch as it generates a highly intense ultrasonic disturbance. Other applications include medical and chemical uses for emulsifying and dissolving purposes and many household applications, such as stirring beverages and various types of whipping and beating operations.

A novel use for the high power high-frequency ultrasonic generator of the present invention is for atomizing fuel in a petroleum combustion system. For this purpose, it would be mounted in a reservoir of the petroleum fuel, in a chamber designed to communicate with the carburetor of the system.

It will be apparent to those skilled in the art that although the invention has been described with reference to specific illustrative embodiments, in terms of specified forms, dimensions, and materials, the invention is limited only by the scope of the appended claims.

What I claim is:

1. In combination, a piezoelectric wafer poled to vibrate in a principal thickness mode of vibrations, said wafer having a thickness substantially a half-wavelength in the frequency of said vibrations, a mounting plate for said piezoelectric wafer comprising a backing disk having a diameter slightly exceeding the diameter of said piezoelectric wafer and having a thickness which is substantially a half-wavelength in the direction of propagation of said thickness-mode vibrations, means for bonding a major surface of said wafer in axially concentric relation to a major surface of said disk and in acoustic coupling contact therewith, the upper and lower major surfaces of said disk containing a pair of matching annular grooves between the periphery of said wafer and the periphery of said disk, the bases of said grooves forming between them a thin annular ring supporting the central portion of said disk at substantially a nodal plane in said vibrations, means for mounting said disk including said piezoelectric wafer bonded to the under surface thereof comprising a shallow cylindrical cup of which said disk forms the closure, said cup having a hollow elbow connection attached to an opening in the cylindrical surface thereof, a tube fixedly coupled to said elbow in substantially liquid-tight relation and disposed so that the principal axis of said tube is substantially parallel to the principal axis of said cup, electrode means contacting opposing surfaces of said piezoelectric wafer, electrical contacting means coupled to said respective electrode means and passing from said cup through said tube, means adapted for coupling said contacting means to a source of electrical oscillations.

2. A combination in accordance with claim 1, wherein said piezoelectric wafer comprises a ceramic material.

3. A combination in accordance with claim 2, wherein said piezoelectric wafer comprises barium titanate having a cobalt additive.

4. A combination in accordance with claim 2, wherein said piezoelectric wafer comprises lead zirconate titanate.

5. A combination in accordance with claim 1, wherein said backing disk comprises a metal having a relatively high coefficient of acoustic conductivity.

6. A combination in accordance with claim 5, wherein said backing disk comprises aluminum.

7. A device for mixing beverages comprising in combination a piezoelectric crystal element having a circular cross sectional dimension poled to vibrate in a thickness mode of vibrations, said element having a thickness which is substantially a half-wavelength in the frequency of said vibrations, a mounting disk having a thickness substantially a half-wavelength in said frequency and a diameter which exceeds the diameter of said crystal element, means for bonding a major surface of said crystal element in axially concentric relation to a major surface of said disk and in acoustic coupling contact therewith, said disk having in the upper and lower faces thereof a pair of annular grooves between the periphery of said disk and the periphery of said element, said grooves each having a substantially rectangular cross section and forming between their bases a thin annular ring contacting the inner portion of said mounting disk at a nodal plane in said vibrations, a shallow cylindrical cup, the peripheral portion of said disk beyond said grooves disposed to close said cup in a liquid-tight seal, said crystal element being directed inwardly and having its inner face vibrating freely in the air chamber formed on the interior of said cup, an elbow connection to the cylindrical side of said cup communicating with said air chamber, a tube rigidly fastened to said elbow and disposed to serve as a handle for said device, electrode means applied to opposing surfaces of said crystal element, means comprising lead wires connected to said electrode means, passing through said elbow and said tube, and adapted for connection to an external source of electrical oscillations, and means for rendering the device substantially liquid tight.

8. A piezoelectric generator comprising in combination:

a piezoelectric crystal element having a circular cross sectional dimension poled to vibrate in a thickness mode of vibrations, said element having a thickness which is substantially a half-wavelength in the frequency of said vibrations, a mounting disk having a thickness substantially equal to a half-wavelength in said frequency and a diameter which exceeds the diameter of said crystal element, means for bonding a major surface of said crystal element in axially concentric relation to a major surface of said disk and in acoustic coupling contact therewith, said disk having in the upper and lower faces thereof a pair of annular grooves between the periphery of said disk and the periphery of said element, said grooves each having a substantially rectangular cross-section and forming between their bases a thin annular ring contacting the inner portion of said mounting disk at a nodal plane in said vibrations,
a shallow cylindrical cup having a bottom wall,
the peripheral portion of said disk beyond said grooves disposed to close said cup in a liquid-tight seal,
said crystal element being directed inwardly and having its inner face spaced from the bottom wall of the cup to define an air chamber between the inner face of the crystal element and the bottom wall, whereby the inner face vibrates freely in said air chamber,
electrode means applied to opposing surfaces of said crystal element,
and means comprising lead wires connected to said electrode means and adapted for connection through a liquid-tight seal to an external source of electrical oscillations.

References Cited by the Examiner

UNITED STATES PATENTS

| | | | |
|---|---|---|---|
| 2,498,737 | 2/1950 | Holden. | |
| 2,592,703 | 4/1952 | Jaffe. | |
| 2,732,835 | 1/1956 | Hundt | 261—1 |
| 2,775,434 | 12/1956 | Probst. | |
| 2,833,999 | 5/1958 | Howry | 310—8.2 X |
| 2,969,512 | 1/1961 | Jaffe et al. | 310—8.2 X |
| 3,059,130 | 10/1962 | Robins | 310—8.2 X |
| 3,198,489 | 8/1965 | Finch | 310—8.2 X |

FRANK W. LUTTER, *Primary Examiner.*

HARRY B. THORNTON, R. R. WEAVER, *Assistant Examiners.*